Patented Dec. 7, 1948

2,455,746

UNITED STATES PATENT OFFICE 2,455,746

STABILIZATION OF VINYL AROMATIC COMPOUNDS

Edwin R. Erickson, Niagara Falls, N. Y., assignor to Mathieson Chemical Corporation, a corporation of Virginia No Drawing. Application March 30, 1944, Serial No. 528,777

17 Claims. (Cl. 260—650)

This invention relates to the stabilization of polymerizable unsaturated aromatic compounds and provides means for retarding or preventing the polymerization of such materials. The invention is particularly applicable to the inhibiting of polymerization of vinyl aromatic compounds such as styrene and various polymerizable substitution products of styrene, notably nuclear chlorinated styrenes. The invention includes improved vinyl aromatic products stabilized against polymerization, as well as the process of stabilization.

Vinyl aromatic compounds are valuable in the production of plastics and rubber-like materials. Their use for such purposes results from their ability to polymerize or to co-polymerize with certain other materials, e. g., butadiene. However, during their preparation, storage, and shipment, for instance, it is important to avoid their polymerization. In general, it is important to avoid polymerization of these materials under uncontrolled conditions which might result in the formation of polymers having undesirable characteristics.

The use of various inhibitors has heretofore been suggested for preventing such polymerization, some of which are reasonably satisfactory, and others of which have been found to be ineffective under conditions frequently encountered. Materials which have previously been suggested for such purposes include tertiary butyl catechol and hydroquinone. The use of the previously suggested inhibitors has been subject to one or more disadvantages, such as insufficient solubility of the inhibitor in the monomer to be protected, ineffectiveness, too great or too little volatility for use under conditions involving distillation of the monomer, too high cost, and difficulties in removing the inhibitor from the polymerizable material when it becomes desirable to effect the polymerization or co-polymerization reaction.

Many of the materials previously suggested as polymerization inhibitors, and found to be fairly effective in inhibiting the polymerization of styrene itself, have been found to be unsuitable for inhibiting polymerization of higher boiling homologues and substitution products of styrene. For example, in the distillation of these polymerizable materials it is usually required that polymerization be prevented throughout the distilling, fractionating and receiving apparatus. In the distillation of dichlorostyrene, for instance, hydroquinone is of such high volatility that it distills out of the mixture leaving residual dichlorostyrene in the still and the fractionating apparatus unprotected by any inhibitor. Thus hydroquinone, while an effective inhibitor for styrene itself, has been found less useful as a polymerization inhibitor in dichlorostyrene or other high boiling substituted styrene products, since it becomes separated from the polymerizable material during distillation, or the like, leaving some portion, at least, of the polymerizable material unprotected. Other previously suggested inhibitors, useful for inhibiting polymerization of styrene, are insufficiently soluble in some of the styrene homologues and consequently have been found unsuitable in this respect.

This invention provides inhibitors for such polymerizable organic compounds which are effective and suited not only for inhibiting polymerization of the unsubstituted monomers but also of the homologues and substitution products thereof.

A further object of my invention is to provide a class of inhibitors from which may be selected specific members having such physical properties as to permit their effective use for the inhibiting of particular polymerizable materials under various conditions.

The inhibitors used in accordance with the invention are 2,5 substituted hydroquinones having hydrocarbon or substituted hydrocarbon radicals in the 2- and 5-positions. The inhibitors of this invention thus have the general formula

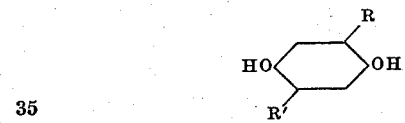

where R and R' are radicals linked to the aromatic nucleus through a carbon atom, and which may be the same or different. These radicals may be aliphatic, alicyclic, aryl or aralkyl, and may contain other substituents such as halogens and oxygen containing groups, such as ether linkages, hydroxyl groups, etc. Included are the aliphatic groups such as methyl, ethyl, propyl, butyl, and amyl. Compounds in which one or both of the radicals R and R' are branched-chain, higher alkyl groups such as secondary and tertiary butyl, tertiary amyl or higher groups including lauryl and even higher molecular weight groups, such as stearyl, are advantageously used. These aliphatic substituted hydroquinones are of particular advantages where great effectiveness is required as for monomers having strong polymerization tendencies. Aromatic substituted compounds include those in which one or both of the radicals R and R' is phenyl, chlorophenyl, dichlorophenyl, tolyl, xylyl and mesityl, and others. Compounds in which one or both of the radicals R and R' is an aralkyl group such as benzyl or an alicyclic group, such as cyclohexyl, are also useful. In general, compounds having at least one aromatic or aralkyl substituent are of advantage because of greater effectiveness, particularly for inhibiting polymerization of the substituted styrenes, e. g., nuclear dichlorostyrenes, and their ease of manufacture. The solubilities of these preferred inhibitors and their vapor pressure curves are especially advantageous for the practice of the processes described in my co-pending applications, Serial No. 461,449, filed October 9, 1942 now abandoned and Serial No. 467,529, filed December 1, 1942 now U. S. Patent No. 2,397,653.

As previously noted, the substituted hydroquinones used in accordance with the invention are particularly effective polymerization inhibitors for the homologues and substituted products of styrene which polymerize more readily than styrene itself. Thus, various dichlorostyrenes are more susceptible to polymerization than is styrene. However, the inhibitors of my present invention thoroughly inhibit polymerization of these dichlorostyrenes, as well as that of unsubstituted styrene and similar materials having lesser tendencies to polymerize than the dichlorostyrenes.

The inhibitors of the present invention may be synthesized by methods known to the art such as the reaction of (1) benzoquinone, an aromatic hydrocarbon and anhydrous aluminum chloride; (2) hydroquinone or a monosubstituted hydroquinone, an alkyl, alicyclic or aralkyl halide and anhydrous ferric chloride; or (3) hydroquinone and an olefin in glacial acetic acid with concentrated sulfuric acid; in other ways, such as the reduction of the corresponding quinones.

The optimum proportion of inhibitor to be used in accordance with the present invention depends upon the particular vinyl aromatic compound to be stabilized, its tendency to polymerize, and upon the treatment to which the vinyl aromatic compound is to be subjected prior to final polymerization to produce plastic or rubber-like products. Proportions ranging as low as about 0.001% by weight deter polymerization. Generally, less than 1% by weight of inhibitor is sufficient though larger proportions, say up to about 5% or more may be used, particularly if the vinyl aromatic compound has a strong tendency to polymerize and is apt to be exposed to conditions favoring polymerization. In any instances where the substituted hydroquinones used in practicing the invention are insufficiently soluble in the polymerizable materials, a mutual solvent for the inhibitor and the polymerizable monomer may be added.

The inhibitor is incorporated in the vinyl aromatic compound by conventional methods such as by adding the inhibitor to the latter with agitation or by percolating the vinyl aromatic compound through a layer or bed of the inhibitor. Many of the inhibitors, because of their substantial solubility, may be conveniently incorporated by preparing a concentrated solution of inhibitor in the monomer to be stabilized and adding this concentrated solution to larger quantities of the monomer. In this way, for example, a 35% solution of 2,5-dibenzyl hydroquinone in nuclear dichlorostyrene is stable and may be proportioned into larger quantities of dichlorostyrene to obtain solutions of, say, 0.5% concentration which will be stable indefinitely with respect to polymerization.

The inhibitors used in accordance with the invention may be used alone, or two or more may be used in admixture, or they may be used along with other inhibitors, such as hydroquinone. For instance, di-p-tolyl-hydroquinone may be used in conjunction with diamylhydroquinone, or dibenzylhydroquinone may be used in conjunction with tertiary butyl catechol. Thus, in the distillation of homologues and substitution products of styrene, such as nuclear dichlorostyrene or trichlorostyrene, for example, one of the inhibitors of the invention, sufficiently non-volatile to remain in the still, one with sufficient volatility to remain in the fractionating column and one of sufficient volatility to pass over with the distillate, may be used with advantage. In some instances, it is possible to select an inhibitor of such volatility that it will remain largely in the fractionating column and a small but sufficient quantity will pass over with the distillate. It is advantageous where the vinyl aromatic compound is to be distilled, to use a plurality of inhibitors of such boiling point characteristics as to afford protection of the vinyl aromatic compound in all stages of the distillation.

The inhibitors used in accordance with the invention have the important advantage of ready removal from the vinyl aromatic compound to permit the polymerization or co-polymerization thereof. Washing the stabilized compound with an aqueous solution of an alkaline material, such as caustic soda, sodium carbonate or the like, is all that is required to remove the inhibitor.

The effectiveness of my new inhibitors in inhibiting polymerization as compared with the effectiveness of previously suggested inhibitors, is demonstrated by adding a given portion of the respective inhibitors to a standardized mixture of isomers of nuclear dichlorostyrene, for example, heating the resultant mixture in a boiling water bath and taking samples periodically until a curdy precipitate is formed when a portion of the sample is added to absolute methanol. Tests were conducted in which 0.25% by weight of the inhibitor was added to the dichlorostyrene mixture, the mixture heated in the boiling water bath and samples of the mixture taken from time to time. Four drops of the respective samples were added to four milliliters of absolute methanol and when a curdy precipitate was obtained, the effectiveness of the inhibitor was deemed to have been dissipated. The results of such tests of the inhibitors of the invention, of four previously suggested inhibitors, and a blank run are recorded in the following table in which the time in minutes is the period over which the respective mixtures could be subjected to the test conditions before the curdy precipitate was formed:

| Inhibitor | Minutes |
|---|---|
| 2,5-Di-p-tolyl hydroquinone | 42 |
| 2,5-Di(phenyl ethyl) hydroquinone | 56 |
| 2,5-Bis(dichlorophenyl ethyl) hydroquinone | 74,112 |
| 2,5-Dibenzyl hydroquinone | 100 |
| 2,-tert.-Butyl-5-dichlorophenyl ethyl hydroquinone | 135 |
| 2,5-Di-tert-amyl hydroquinone | 240 |
| 2,5-Di-tert.-butyl hydroquinone | 264 |
| Hydroquinone | 30 |
| Chlorohydroquinone | 10 |
| Catechol | 10 |
| p-tert.-Butyl catechol | 12 |
| Uninhibited nuclear dichlorostyrene | 3 |

The results of such tests as applied to the inhibiting of styrene by the addition of 0.05% by weight of 2,5-dibenzylhydroquinone and the induction period of uninhibited styrene are recorded in the following table:

| Inhibitor | Time |
|---|---|
| | Hours |
| 2,5-Dibenzylhydroquinone | 22.5 |
| Uninhibited styrene | 0.87 |

These tests illustrate the outstanding value of the inhibitors of polymerization of vinyl aromatic compounds used in accordance with the present invention. It will be noted that the period of protection of the dichlorostyrene, under conditions of the test, afforded by the use of the inhibitors of the invention was as much as 8.8 times that of the best of the previously proposed inhibitors.

The invention is applicable to the stabilization of vinyl aromatic compounds generally, including those having side chain substituents such as alpha-methyl styrene and p-chloro-alpha-methyl styrene, nuclear alkylated vinyl aromatics such as p-ethyl styrene, as well as polyvinyyl aromatics such as divinyl benzene and polynuclear compounds such as vinyl naphthalene. Vinyl heterocyclic compounds having aromatic character such as vinyl pyridine and vinyl thiophene may also be stabilized by the inhibitors used in accordance with this invention.

The terms "polymerize," "polymerizable" and "polymerization" are used herein in a general sense to include inter-polymerization between unlike molecules, as well as union of two or more like molecules by addition.

I claim:

1. A compound selected from the group consisting of styrene and polymerizable ring chlorinated styrenes having dissolved therein as a stabilizer a 2,5-disubstituted hydroquinone in which the substituents are selected from the group consisting of alkyl and aralkyl radicals.

2. A compound selected from the group consisting of styrene and polymerizable ring chlorinated styrenes having dissolved therein as a stabilizer from about 0.001% to about 5% by weight of a 2,5-disubstituted hydroquinone in which the substituents are selected from the group consisting of alkyl and aralkyl radicals.

3. A compound selected from the group consisting of styrene and polymerizable ring chlorinated styrenes having dissolved therein as a stabilizer a 2,5-dialkyl hydroquinone.

4. A nuclear dichlorinated styrene having dissolved therein as a stabilizer a 2,5-disubstituted hydroquinone in which the substituents are selected from the group consisting of alkyl and aralkyl radicals.

5. A nuclear dichlorinated styrene having dissolved therein as a stabilizer a 2,5-dialkyl hydroquinone.

6. A nuclear dichlorinated styrene having dissolved therein as a stabilizer 2,5-di-tert.-amylhydroquinone.

7. A nuclear dichlorinated styrene having dissolved therein as a stabilizer from about 0.001% to about 5% by weight of 2,5-di-tert.-amylhydroquinone.

8. A nuclear dichlorinated styrene having dissolved therein as a stabilizer 2,5-di-tert.-butylhydroquinone.

9. A nuclear dichlorinated styrene having dissolved therein as a stabilizer from about 0.001% to about 5% by weight of 2,5-di-tert.-butylhydroquinone.

10. A compound selected from the group consisting of styrene and polymerizable ring chlorinated styrenes having dissolved therein as a stabilizer a 2,5-di-aralkyl hydroquinone.

11. A nuclear dichlorinated styrene having dissolved therein as a stabilizer a 2,5-di-aralkyl hydroquinone.

12. A nuclear dichlorinated styrene having dissolved therein as a stabilizer from about 0.001% to about 5% by weight of 2,5-dibenzylhydroquinone.

13. The process of stabilizing a compound selected from the group consisting of styrene and polymerizable ring chlorinated styrenes which includes admixing therewith a 2,5-disubstituted hydroquinone in which the substituents are selected from the group consisting of alkyl and aralkyl radicals.

14. The process of stabilizing a compound selected from the group consisting of styrene and polymerizable ring chlorinated styrenes which includes admixing therewith from about 0.001% to about 5% by weight of a 2,5-disubstituted hydroquinone in which the substituents are selected from the group consisting of alkyl and aralkyl radicals.

15. The process of stabilizing a nuclear dichlorinated styrene which includes admixing therewith a 2,5-disubstiuted hydroquinone in which the substituents are selected from the group consisting of alkyl and aralkyl radicals.

16. The process of stabilizing a nuclear dichlorinated styrene which includes admixing therewith a 2,5-dialkylhydroquinone.

17. The process of stabilizing a nuclear dichlorinated styrene which includes admixing therewith from about 0.001% to about 5% by weight of 2,5-di-tert.-amylhydroquinone.

EDWIN R. ERICKSON.

REFERENCES CITED

The following references are of record in the file of this patent:

UNITED STATES PATENTS

| Number | Name | Date |
|---|---|---|
| 1,910,962 | Pitman | May 23, 1933 |
| 2,052,859 | Wilson | Sept. 1, 1936 |
| 2,084,754 | Wilson | June 22, 1937 |
| 2,121,010 | Britton et al. | June 21, 1938 |
| 2,225,471 | Foord | Dec. 17, 1940 |